United States Patent
Fazeny

(10) Patent No.: US 8,830,489 B2
(45) Date of Patent: Sep. 9, 2014

(54) LASER PLOTTER AND METHOD FOR ENGRAVING MARKING AND/OR INSCRIBING A WORKPIECE

(75) Inventor: Stephan Fazeny, Gmunden (AT)

(73) Assignee: Trotec Produktions U. Vertriebs GmbH (AT)

( * ) Notice: Subject to any disclaimer, the term of this patent is extended or adjusted under 35 U.S.C. 154(b) by 84 days.

(21) Appl. No.: 13/470,706

(22) Filed: May 14, 2012

(65) Prior Publication Data

US 2013/0114114 A1    May 9, 2013

(30) Foreign Application Priority Data

Nov. 7, 2011   (AT) ................................. A 1636/2011

(51) Int. Cl.
*H04N 1/40*     (2006.01)
*B23K 26/08*    (2014.01)
*B41M 5/26*     (2006.01)

(52) U.S. Cl.
CPC .............. *B23K 26/0807* (2013.01); *B41M 5/26* (2013.01)
USPC ............................ 358/1.12; 358/296; 358/1.7

(58) Field of Classification Search
USPC ............ 358/1.4, 1.7, 1.12, 1.9, 2.1, 448, 468, 358/296

See application file for complete search history.

(56) References Cited

U.S. PATENT DOCUMENTS

| 4,877,939 A | 10/1989 | Duley et al. |
| 5,997,119 A * | 12/1999 | Kerr ........................... 346/139 R |
| 6,313,433 B1 | 11/2001 | Sukman et al. |
| 6,423,925 B1 | 7/2002 | Sukhman et al. |
| 6,822,192 B1 | 11/2004 | Young |
| 2007/0120842 A1 | 5/2007 | Hess |
| 2012/0074107 A1* | 3/2012 | Berthe et al. ............. 219/121.69 |

FOREIGN PATENT DOCUMENTS

WO         99/38643 A1      8/1999

* cited by examiner

*Primary Examiner* — Thomas D Lee
*Assistant Examiner* — Stephen M Brinich
(74) *Attorney, Agent, or Firm* — Lerner, David, Littenberg, Krumholz & Mentlik, LLP

(57) ABSTRACT

The invention describes a laser plotter and a method for engraving, marking or inscribing a workpiece. Two lasers are installed in a housing of the laser plotter and may alternatively operate on the workpiece. The workpiece is positioned on a processing platform and a laser beam is sent to at least one focusing unit configured for both lasers, from which the laser beam is deflected in the direction of the workpiece. Control of the workpiece is obtained by software running in a control unit. Graphic and/or text data are prepared on an external computer or other control device, and transferred to the control unit of the laser plotter. The lasers are allocated to the transferred data based on color code, whereby a height correction value to compensate for the various focal lengths of the lasers is preloaded in the data bank for the different colors.

7 Claims, 2 Drawing Sheets

LASER PLOTTER AND METHOD FOR ENGRAVING MARKING AND/OR INSCRIBING A WORKPIECE

The invention relates to a method for engraving, marking and/or inscribing a workpiece with a laser plotter or laser engraver, in which a plurality, in particular two radiation sources in the form of lasers are installed in a housing of the laser plotter and preferably operate in alternation on the workpiece to be processed, wherein the workpiece is positively positioned on a processing platform and a laser beam emitted by the radiation source is sent via deflecting elements to at least one focusing unit configured for both radiation sources, from which the laser beam is deflected in the direction of the workpiece and focused for processing, wherein control, in particular the positional control of the workpiece with respect to the laser beam, is obtained by means of software running in a control unit, wherein a graphic and/or a text is/are prepared on an external component, in particular a computer or a control device and transferred to the control unit of the laser plotter, which uses a preloaded data bank to carry out a conversion of the transferred data, in particular the graphic and/or the text, to control the individual elements of the laser plotter (1), as defined in claim 1.

The invention also relates to a laser plotter for engraving, marking and/or inscribing workpieces, consisting of a processing platform for positioning the workpiece, at least two radiation sources in the form of lasers with appropriate deflecting elements and a preferably movable focusing unit and a control unit to control the individual elements, wherein the control unit is configured to receive data produced by an external component, in particular a graphic and/or a text, and a data bank is provided for converting the transferred data, as defined in claim 10.

The prior art, in particular WO 1999/038643 A, discloses a laser plotter for engraving, marking and/or inscribing, wherein a plurality, in particular two radiation sources in the form of lasers are disposed and operated in a housing. The lasers preferably operate on the workpiece to be processed in alternation, wherein the workpiece is positively positioned on a processing platform. A laser beam emitted by the radiation source is sent via deflecting elements to at least one focusing unit constructed for both radiation sources, from which the laser beam is deflected in the direction of the workpiece and focused for the purposes of processing. The workpiece is controlled, in particular positionally, with respect to the laser beam by means of software running in a control unit. In this manner, a graphic and/or a text prepared on an external component, in particular a computer or a control device is transferred to the control unit of the laser plotter, which uses a preloaded data bank to convert the transferred data, in particular the graphic and/or text, to control the individual elements of the laser plotter.

The disadvantage in this case is that with laser plotters of this type, allocation of the individual radiation sources, in particular lasers, have to be manually adjusted to the properties of the material of the workpiece by the user each time a new operation is carried out.

U.S. Pat. No. 4,877,939 A discloses a device for processing workpieces using laser radiation, comprising a first laser with a first wavelength and a second laser with a second wavelength. The first laser pre-processes the surface, in particular by scoring the workpiece, whereas the second laser delivers the actual working beam. The lasers may be of different types, such as $CO_2$, YAG or UV lasers.

Furthermore, U.S. Pat. No. 6,313,433 B and U.S. Pat. No. 6,423,925 B describe a laser processing apparatus that comprises a beam deflecting device with which a processing beam can be displaced in the XY plane and two stand-alone, independently controllable or regulatable laser sources. The laser sources are operated in parallel.

The aim of the present invention is to provide a laser plotter and a method for engraving, marking and/or inscribing in which different laser sources can be used for different surfaces without interruption to the operation, so that quality is improved and operational time savings are high. A further aim is to improve the ease of operation of a laser plotter of this type and to minimize possible inputting errors.

The aim of the invention is accomplished in that the different radiation sources are allocated to the transferred graphic and/or the text in the form of colors, in particular a color code, whereby a correction value for the various positions, in particular a height correction value to compensate for the various focal positions or focal lengths of the various radiation sources, is preloaded in the data bank for the different colors.

Advantageously thereby, the user inputs the data, in particular the correction value for the different lasers, and then that data can be consulted for each new engraving procedure. Since the allocation of the laser is defined by colors, the risk of mistakes is also substantially reduced, since the colors can be matched to the materials to be processed. A substantial advantage is that it will now be a simple matter of defining different colors for a wide variety of levels and a wide variety of engraving depths, meaning that a very simple allocation is possible, rather than, as is usual in the prior art, of having to input appropriate values for a wide variety of conditions. Advantageously again, using colors as the criterion for differentiating between the various lasers and/or engraving depths and/or processing levels gives rise to the possibility that a multitude of different programs or software can be used, as only the appropriate color or color code has to be selected in the program. Thus, each user can employ the software most familiar to him and exchange of data with the control unit of the laser plotter can be carried out with no need for compatibilization, converting and/or programming procedures. Preloading the values just once also avoids inputting errors.

Further, the fact that standard programs such as Word, Excel, Paint, Corel Draw etc. can be used that run on the external components and on which the graphic and/or text can be prepared in different colors and then transferred to the control unit of the laser plotter is advantageous because this means that the user's favorite software can be employed, saving on the high costs of training and compatibilization that are required for specialized control programs. This also means that the user can select the best possible surface for preparing the graphic or the text.

The fact that different colors are defined for different engraving depths and/or different workpiece heights and that different height values are allocated to these colors advantageously means that not only flat workpieces or blanks, but also workpieces with different processing levels can be processed; furthermore, allocation is simplified by using colors. An optical representation of the engraving or text is a simple matter and so the user can instantly recognize or allocate a wide variety of heights by the different colors.

The fact that each color of the graphic and/or text is allocated a specific pre-defined color code in the external component or upon transferal to the control unit or by the control unit itself is of advantage since this means that compatibilization with the laser plotter is a simple, easy matter.

The fact that the color, in particular the color code, from the various external components, in particular the various graphics software programs, is allocated by the control unit of the laser plotter is of advantage since in this way, fast transferal times are achieved since no more compatibilization has to be undertaken, but all the same, unambiguous allocation is possible.

The fact that in the control unit of the laser plotter, the color codes transferred from the various components are each allocated a preloaded color code for the external component used means that advantageously, appropriate compatibilization can be carried out for each application. Thus, even better quality can be obtained, or depending on the application, a plurality of colors can be made available to the user.

However, it is also advantageous when a color, in particular a color code, is specified by a range, in particular a from/to range, since this creates more scope for allocation and the user no longer has to use the exactly prescribed color, in particular the exact color code. This considerably simplifies selection of colors by the users in the various programs.

The fact that the correction value for the radiation source is combined with the color code for the engraving depth is also advantageous since this means that the user does not have to consider which of the various lasers or radiation sources to be used.

When the workpiece is, for example, a ballpoint pen with different engraving zones and different height positions, then advantageously, different colors can be defined for the various zones and levels so that the preparation of a graphic and/or a text is simplified, since the user does not have to consider any of the properties of the workpiece, such as the different engraving levels.

Furthermore, the aim of the invention is achieved by means of a laser plotter wherein the different beam sources can be allocated to the transferred graphic and/or the transferred text in the form of colors, in particular a color code, whereby a correction value for the different positions, in particular a height correction value, is preloaded in the data bank for the different colors of the different beam sources.

Advantageously, to make operation very simple for the user, the engraving properties of the prepared graphic or the text can also be recognized optically in the application software. Thus, it is possible to use a very large number of standard programs or software.

In an advantageous embodiment, to engrave the workpiece, the height of the processing platform and/or the focusing unit can be adjusted, since this means that different levels can then easily be processed and/or different engraving depths can be produced.

In one embodiment, in which the external component is constituted by a computer or a control device on which software can be used to prepare the graphic and/or text and is connected via a secure, fast data link to the laser plotter, in particular the control unit, the user advantageously has the opportunity to use any software to prepare the graphic and/or the text. This also means that the user has the opportunity to prepare the graphic and/or text in peace in an area that is separate from the laser plotter and then to transmit it to the laser plotter over a standard network, in particular over an intranet.

In an embodiment in which different colors are defined for the different engraving depths and the different radiation sources, then advantageously, the user can prepare the graphic and/or the text on any software that has that color available. Thus, the user no longer needs to input any values for corrections and height details, and so typing errors can be eradicated.

In an advantageous embodiment, the workpiece is formed as a ballpoint pen with a plurality of engraving zones and different engraving heights, since different colors can be defined for the different zones and thus operation is greatly simplified.

In another advantageous embodiment, in the data bank, a color code is allocated to the various colors; this means that any corrections that are necessary can then be made simply and easily by updating the color code.

Finally, in a still further advantageous embodiment, a range, in particular a from/to range, is preloaded into the data bank for a color, in particular for the color code, since this simplifies selection of the color in the various programs, and the user no longer needs to select the exact color, but can select a color that falls within this range.

The invention will now be described with reference to an exemplary embodiment. It should, however, be noted that the scope of the invention is not limited to the exemplary embodiment described and shown.

Figure 1:
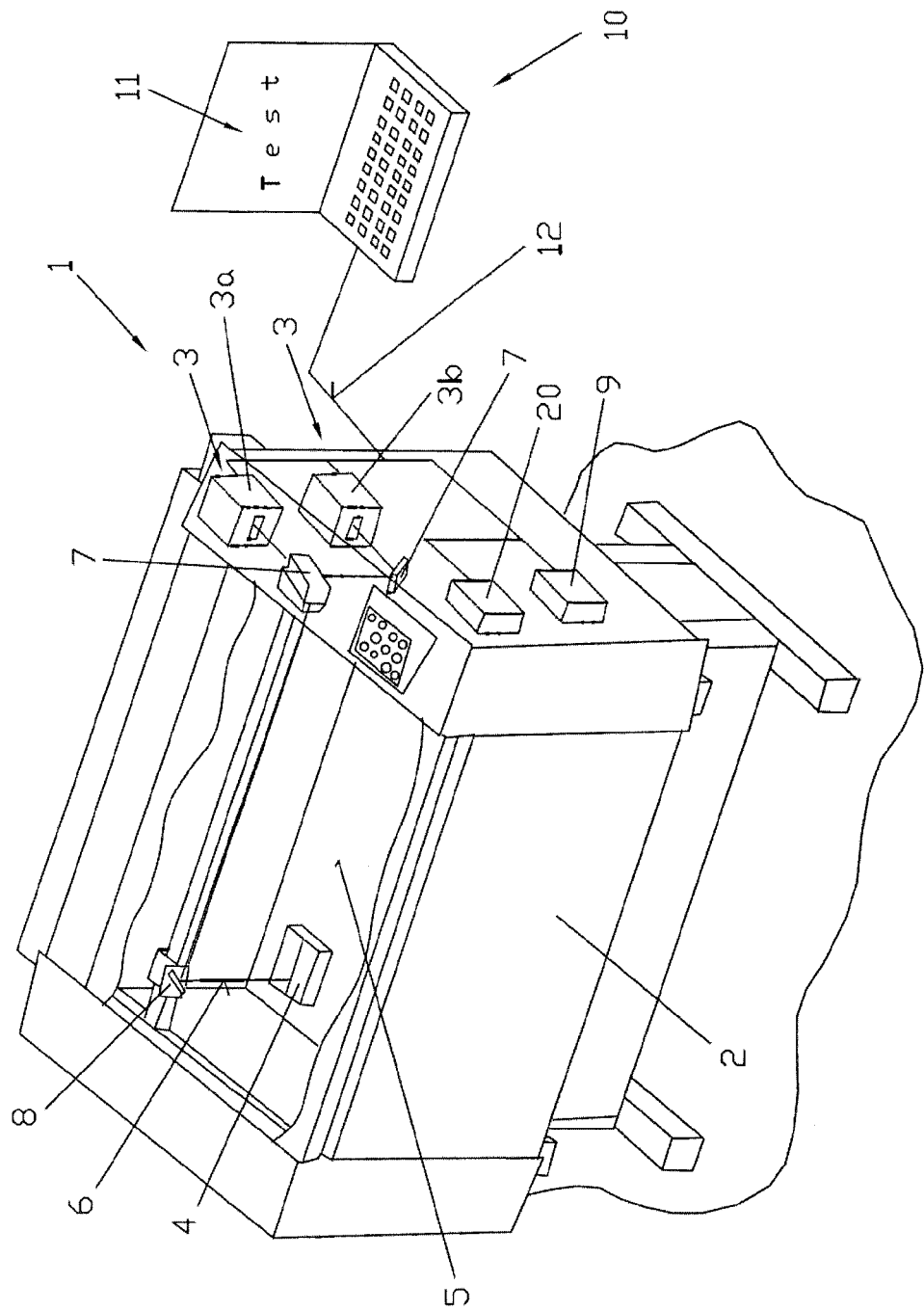
FIG. 1 is a diagrammatic representation of a laser plotter.

It should initially be pointed out that in the various embodiments described, identical parts are provided with identical reference numerals or the same component descriptions, wherein the disclosure of the whole description can be applied mutatis mutandis to identical parts with identical reference numerals or identical component descriptions. In addition, the positional descriptors in the description, such as top, bottom, side etc., are references to the figure being described and illustrated at that time; they are to be applied mutatis mutandis to the new position when the position is changed. Furthermore, individual features or combinations of features from the various illustrated and described embodiments represent individual inventive solutions.

FIG. 1 is a diagrammatic representation of a laser plotter 1, also known as a laser engraver, in which a plurality, in particular two radiation sources 3 in the form of lasers 3a, 3b are disposed and operated in a housing 2; the lasers preferably work in alternation on the workpiece 4 to be processed, wherein the workpiece 4 is positively positioned on a processing platform 5 and a laser beam 6 emitted by the radiation source 3 is sent via deflecting elements 7 to at least one displaceable focusing unit 8 that is configured for both radiation sources 3, from which the laser beam 6 is deflected in the direction of the workpiece 4 and focused for processing. Control, in particular positional control of the workpiece 4 with respect to the laser beam 6, is accomplished via software that runs in a control unit 9, wherein a graphic and/or a text, diagrammatically shown on a computer, is prepared on an external component 10, in particular a computer or a control device, and is then transferred to the control unit 9 of the laser plotter 1, via a data link 12, and then undertakes a conversion of the transferred data, in particular the graphic and/or the text 11, using a preloaded data bank, in order to control the individual elements of the laser plotter 1. The detailed mechanical construction of this type of laser plotter 1 will not be described in detail here since it is already known in the art, in particular in the Applicant's WO 1999/038643 A, from which further details can be obtained.

In accordance with the invention, control of the laser plotter 1 is simplified such that operation by the user is facilitated and errors in the allocation of the laser 3a, 3b are minimized. To this end, the allocation of the transferred graphic and/or the transferred text 11 to the different radiation sources 3 is in the form of colors, in particular a color code, whereby a correction value is preloaded or is present in the data bank in respect of the different colors for the different positions, in particular a height correction value to compensate for the different focal positions or focal lengths of the different radiation sources 3.

It can thus be said that a single color is allocated to each laser 3a, 3b, wherein this color has a value for the correction of the wavelength allocated to it in the data bank. As an example, when processing wood, the color "brown" is allocated to the first radiation source 3, in particular to the first laser 3a, whereas the color "gray" is allocated to the second radiation source 3, in particular to the second laser 3b, when processing metal. In this manner, the user can allocate the laser 3a, 3b to the materials to be processed in a simple manner, and so the risks of mistakes and of inputting the wrong values are minimized, i.e., for example, the color brown is used when processing wood, in particular the radiation source 3 for wood, whereas the color gray, in particular the radiation source 3, is used when processing metal; preferably, a wide variety of shades of these colors are also appropriately allocated. Since an appropriate correction value has already been allocated to the colors in the data bank, the user only needs to prepare the graphic or the text 11 in the right color, whereupon the control unit will apply the appropriate correction. Thus, inputting errors that crop up again and again can be minimized.

In order to prepare a graphic or a text 11, the user can employ an external component 10, in particular a PC, a laptop, etc., running a standard program such as Word, Excel, Paint, Corel Draw, etc. this means that the user can prepare the graphic and/or the text 11 simply and easily using the programs, whereby he selects colors that already correspond, i.e. he prepares the graphic and/or the text 11 in color. The external component 10 is then linked to the control unit 9 of the laser plotter 1 so that the graphic and/or the text 11 can be transmitted to the control unit 9. Clearly, it is possible for the external component 10 to be linked to the laser plotter 1 already, in particular to the control unit 9, while the graphic and/or the text 11 is being prepared. It is also possible for the laser plotter 1 to be provided with a graphic display (not shown) and for the user to prepare the graphic and/or the text 11 directly on the laser plotter 1. It is also possible for a standard program, for example Word, Excel, Paint, Corel Draw, etc., to be installed directly in the laser plotter 1, whereupon the laser plotter 1 will have appropriate hardware for operating the necessary operating system and the program. It is also possible in this respect for the operating system and the programs to run in the control unit 9 or for a stand-alone unit to be installed on which the software runs and which transfers data to the control unit 9. The control unit 9 controls the individual elements of the laser plotter 1 to produce an engraving, marking and/or inscription on the workpiece 4.

Since standard programs of this type have different color tones, different color codes are assigned to the colors and the user can load an appropriate range into the data bank, i.e. the user loads a from/to range into the data bank, so that every identical value or intermediate value is allocated to the appropriate radiation source 3. Clearly, it is also possible for the user to input just one value and for a predefined range to be determined or defined by the data bank. It is also possible for a unique range to be independently defined for each program so that special programs can also be used that employ a completely different color code or use another identification instead of a code. This is pre-defined by the user in the data bank and an appropriate from/to range is allocated to this program so that upon subsequent data transfer, the control unit 9 preferably automatically recognizes the software or records/identifies and stores the transferred data so that upon renewed data transfer, automatic recognition of the software is possible and the corresponding values can be allocated. In this regard, advantageously, prior to data transfer the user manually starts recording the transfer, since this ensures that a complete set of data that the user will definitely be entering is being transferred. With special programs using special codes, the software, in particular the data or codes, can in particular be entered simply and without errors.

It is also possible for different colors to be defined on the external component 10 for different graphic depths and/or different workpiece heights 13, 14 or levels, and for different height values to be allocated to these colors, i.e. for a workpiece 4 with a structured surface, a specific color can be allocated to different surface heights, which has a further correction value preloaded or assigned in the data bank for the control unit 9, so that the different focal points for the different lasers 3a, 3b of the focusing unit 8 in general can be compensated for and the user no longer needs to consider this factor. It is also possible for different colors to be used for the wide variety of engraving depths; in this case, additional correction values are defined or inputted and stored.

Preferably, a specific pre-defined color code is allocated to every color of the graphic and/or the text 11 in the external component 10 or on transfer to the control unit 9 or by the control unit 9 itself. This ensures that a value is always available for the wide variety of colors or shades and thus an appropriate design of the range in the data bank will mean that the laser 3a, 3b to be used will be reliably identified. If, for example, a color or a color code is used which has not yet been preloaded or stored, on transfer or allocation of a value, it is possible for an error message to be generated by the control unit 9 so that prior to starting the engraving, marking and/or inscribing procedure, the user can allocate this value to a laser 3a, 3b or can input an appropriate value. In such a case, the user also has the opportunity to store this new value in the data bank for a radiation source 3 so that when the procedure is carried out again, this value or this color can be properly allocated.

Normally, the colors, in particular the color codes from the various external components 10, in particular the various graphic software programs, are allotted by the control unit 9 of the laser plotter 1, however, it is possible for these values to be appropriately updated upon allocation, i.e. depending on the program used, for example, an appropriate key may be preloaded which modifies the transmitted color code accordingly. Thus, the storage space in the data bank can be kept small since the values will be amended by the wide variety of programs and thus only a small number of color codes will have to be stored. It is also possible to insert new, as yet undefined programs or codes that then only have to be correctly allocated.

Preferably, the laser plotter 1 or the control unit 9 of the laser plotter 1 is equipped so that an appropriate display is available on which the graphic and/or the text 11 prepared on the external component 10 can be displayed. Thus, the user is informed as to which laser 3a, 3b has which color allocated to it, or can run a simulation that shows which laser 3a, 3b is used when and for which graphic or text 11. In this manner, simple control is possible directly on the control unit 9, in particular on the laser plotter 1. Clearly, it is also possible for the user to make corrections directly on the laser plotter 1.

Figure 2:
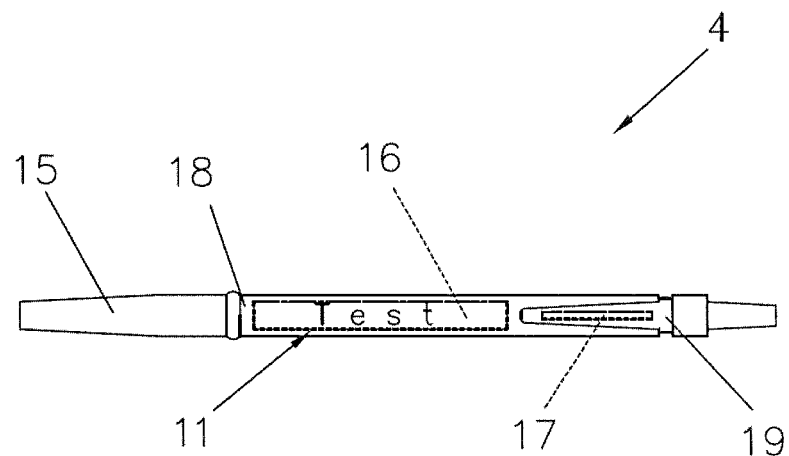
FIG. 2 is a diagrammatic representation of a workpiece in the form of a ballpoint pen.
Figure 3:
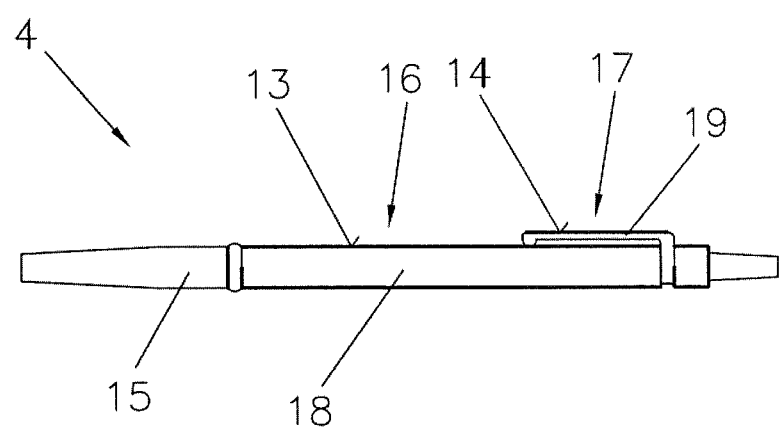
FIG. 3 is a side view of the workpiece, in a simplified diagrammatic representation.

It is possible, for example, for the workpiece 4 to be constituted by a ballpoint pen 15 with a plurality of engraving zones 16, 17 and different engraving heights or workpiece heights 13, 14; thus, the engraving zones 16, 17 are disposed at different levels. In this case, it is possible for the programs, in particular in the external component 10 or in the control unit 9 itself, to store or preload the ballpoint pen 15 or other workpieces 4 as a template so that the user can easily access it again and again. By storing the workpiece 4 as a template, the user can also advantageously define or store appropriate engraving zones 16, 17 or inscription zones for it for which specific data, information etc. have been preloaded. When using a ballpoint pen 15 as the workpiece 4, two engraving zones 16, 17 are preferably present, as is represented diagrammatically in FIG. 2 in dashed lines, wherein the first engraving zone 16 is in the base unit 18 of the ballpoint pen 15 and the second engraving zone 17 is disposed on the clip 19. Thus, the surfaces of the two engraving zones 16, 17 are at different levels; this fact has to be taken into account when processing. Further, it is often the case that different materials are used in ballpoint pens 15, such as wood for the base unit 18 and metal for the clip 19 or plastic for the base unit 18 and metal for the clip 19; again, this is important for processing, since the lasers 3a, 3b that are available are used to process different materials. Thus, for high quality engraving, marking or inscription, it is necessary for the right laser 3a, 3b to be used for the material to be engraved, and so for different materials, the ballpoint pen 15 is processed using both lasers 3a, 3b in one operation, i.e. the ballpoint pen 15 is positioned once on the processing platform 5 and then after starting the processing procedure, firstly, the first engraving zone 16 is processed, for example with the second laser 3b, and next, the second engraving zone 17 is processed, for example with the first laser 3a, without removing the workpiece 4 or the ballpoint pen 15 from the processing platform 5 or changing the position or installing or changing it for another radiation source 3 after the first processing step. As an example, the first laser 3a can process metal by means of a $CO_2$ laser with a power of up to 200 Watt and the second laser 3b can process wood or plastic by means of an infrared diode laser with a power of up to 100 Watt. Clearly, it is possible to use similar lasers 3a, 3b with similar powers to process one engraving zone 16, 17 with both lasers 3a, 3b in alternation. For completeness, it should be pointed out that clearly, any number of engraving zones 16, 17 may be disposed, prepared or defined on one workpiece 4, in particular on a ballpoint pen 15.

A procedure of this type for engraving a ballpoint pen 15 may, for example, be carried out as follows:

Using the standard programs on the external component 10, the user selects a particular workpiece 4, for example the ballpoint pen 15, from the preloaded workpieces 4. This workpiece 4, in particular the selected ballpoint pen 15, will then be displayed graphically on the display or screen of the external component 10, and simultaneously the possible engraving zones 16, 17 will be displayed schematically. By clicking on an engraving zone 16, 17, the user can select that zone and will be prompted to specify the material for this engraving zone 16, 17, whereupon, for example, a preloaded list will be displayed, from which he selects the material to be processed, for example wood, plastic, metal, etc., i.e. after touching or activating an engraving zone 16, 17, the material to be processed and/or the laser 3a, 3b to be used is selected. After selecting the appropriate material for this engraving zone 16, 17, the user then obtains the possible color codes and/or colors in the form of spots, bars, etc. on the display, so that after selecting the color, the user can produce a corresponding graphic 11 or a corresponding text 11 with this color in the selected engraving zone 16, 17, i.e. the user selects specific colors and/or color codes for an engraving zone 16, 17. Clearly, it is possible in this regard that different engraving heights or engraving depths could be used within one engraving zone 16, 17, whereupon the user then simply selects another color that represents another engraving depth, i.e. that color out of the colors that are available that represents or is allocated to a specific parameter or a combination of parameters, such as engraving depth, engraving width, etc. Preferably, the names of the colors are displayed so that the user can instantly recognize which color is used for what purpose. As an example, within the color bar or color spot, the engraving depth or the engraving width can be entered, so that the user can see or note the color and the engraving depth or engraving width at a glance. After the user has prepared the graphic 11 and/or the text 11 for the first selected graphic zone 16, he simply selects the next engraving zone 17 and will again be prompted to select the material for that zone. If he selects another material, then preferably color palette other than that displayed for the first engraving zone 16 will be made available, using another material. In this manner, allocation of the colors is always unambiguous and the user cannot confuse them; a specific color stands for only one specific engraving procedure and different preloaded parameters.

With such a simplified procedure, it is essential that the data are appropriately preloaded in the data bank and/or for the stored workpiece 4. As an example, with the procedure described above, for one color, one or more of the following data points or parameters are stored:—radiation source 1 or 2,—engraving depth,—workpiece level,—correction value for laser,—engraving width,—engraving depth,—power of radiation source,—frequency,—speed,—throughput,—gas,—material,—high quality,—color and/or color code (in particular from/to color code range),—workpiece level,—engraving zone,—workpiece (in particular workpiece name, workpiece number), etc.

Thus, matters are much simpler for the user than with the prior art, and sources of errors can also be minimized. The user does not in any way need to worry about corrections or focusing the various lasers since this has already been preloaded. With a procedure of this type, erroneous inputting is also advantageously minimized, since the user can only choose from parameters that are specifically allocated to the engraving zones 16, 17. After selecting an engraving zone 16, 17, it is essential for the user to select a material to be processed or a laser 3a, 3b, whereupon only those colors that are allowable when processing this material or when using lasers 3a or 3b will be made available to the user, i.e. selecting a material makes the correct laser 3a, 3b available along with the appropriate preloaded correction value and moreover, provides the user with suggestions for the various engraving depths and/or engraving widths etc. having the various colors. To produce the various engraving depths, in the embodiment illustrated, the processing platform 5 will be moved in accordance with the preloaded values.

It is also possible that when supplying the laser plotter 1, to also supply standard workpieces 4 such as various ballpoint pens 15, bottle openers, knives, etc., for the wide variety of software applications in a memory of the laser plotter 1 or in a memory of an external control unit 9 for the laser plotter 1 or on a CD-ROM or DVD which is supplied as well. With these predefined workpieces 4, the most common engraving zones 16, 17 are defined on the virtual workpieces 4, and preferably each possible engraving zone 16, 17 has its own preloaded color palette. In this manner, the user only needs to match the workpieces 4, in particular the engraving zone 16, 17, to the blank to be processed and to input the appropriate correction values for the laser 3a, 3b used or to select the laser 3a, 3b from a list. The other required data, such as engraving depth, processing height or processing plane, etc., are already stored with respect to the preloaded workpieces 4 and the various possible colors, meaning that a laser plotter 1 of this type is easy to operate. Clearly, the user can edit the preloaded workpieces 4 and define new engraving zones 16, 17 or erase or enlarge predefined engraving zones 16, 17. It is also possible to simply amend the preloaded data and thus match them to the required values.

It is also possible for an identification device 20 to be disposed in the laser plotter 1, which automatically recognizes the installed radiation source 3. In this manner, in the event of changing one or both radiation sources 3, it is possible for the identification device 20 to recognize the newly installed radiation source 3 and to show the user or automatically provide the correction values, i.e. a wide variety of correction values are preloaded in a data bank for a wide range of radiation sources 3, so that when at least one radiation source 3 is changed, the preloaded value for the old radiation source 3 is changed. In this regard, it is also possible for the radiation source 3 to have a chip, barcode, memory or transponder, in particular a RFID element, which is interrogated by the identification device 20. In this system it is possible for a wide range of data for the radiation source 3 to be supplied with it, which is interrogated by the identification device 20 and automatically matched. Preloading the correction value is advantageous as this means that an internal data bank for the various radiation sources 3 can be dispensed with and newly developed radiation sources 3 can be installed ad infinitum without the user having to input the correction value manually or having to update the data bank.

When an automatic identification device 20 is not present, it is also possible for the user to have access to a radiation source data bank of the type from which a radiation source 3 can be manually selected so that all necessary data, in particular the correction value, can be matched up appropriately.

Automatic identification of the radiation source is particularly suitable when the laser plotter 1 is constructed in modular form as regards the various lasers 3a or 3b, i.e., for example, a wide variety of radiation sources 3 are installed for the wide variety of workpieces 4 to be processed, which can be swopped over with little manual intervention; a pickup device (not shown) with automatic positioning and contacting is installed for this purpose. Thus, if a user changes a radiation source 3, the newly installed radiation source 3 is recognized and the appropriate data are called up and then used.

Clearly, it is also possible for the laser plotter 1 described above to cut the workpiece 4 to be processed, namely for the focal point of one of the two lasers 3a, 3b to be set below the workpiece 4 or the processing platform 5 to be moved and the processing platform procedure to be carried out several times in succession so that the laser beam 6 penetrates through the workpiece 4 and cuts it at this location. It is also possible for processing of the workpiece 4 to cause only a color change in the surface.

The invention claimed is:

1. A laser plotter for engraving, marking and/or inscribing workpieces, consisting of a processing platform for positioning the workpiece, at least two radiation sources in the form of lasers with at least one deflecting element and a movable focusing unit and a control unit to control the individual elements, wherein the control unit is configured to receive data produced by an external component, from a graphic and/or a text, and a data bank is provided for converting the transferred data, characterized in that the different radiation sources are allocated by color or a color code to transfer the graphic and/or the text, whereby a correction value for the various positions, as a height correction value for the various radiation sources, is preloaded in the data bank for the various colors.

2. The laser plotter as claimed in claim 1, wherein to engrave the workpiece, the processing platform and/or the focusing unit is/are height adjustable.

3. The laser plotter as claimed in claim 1, wherein the external component is constituted by a computer or a control device on which software for the preparation of the graphic and/or the text can be used, and this is linked to the laser plotter via a data link.

4. The laser plotter as claimed in claim 1, wherein different colors are defined for the various radiation sources and for a variety of engraving depths.

5. The laser plotter as claimed in claim 1, wherein the workpiece is formed as a ballpoint pen with a plurality of engraving zones and different engraving heights.

6. The laser plotter as claimed in claim 1, wherein a color code is allocated to the various colors in the data bank.

7. The laser plotter as claimed in claim 1, wherein a range, in particular a from/to range, is preloaded in the data bank in respect of a color or the color code.

* * * * *